United States Patent
Schweinfurth et al.

[15] 3,687,420
[45] Aug. 29, 1972

[54] DEVICE FOR MIXING GRANULAR AND/OR PULVERIZED BULK MATERIAL

[72] Inventors: Hans Schweinfurth; Rolf Lambach, both of Hagen, Germany

[73] Assignee: Friedrich UHDE GmbH, Dortmund, Germany

[22] Filed: May 22, 1970

[21] Appl. No.: 39,892

[30] Foreign Application Priority Data

May 23, 1969    Germany..........P 19 26 291.0

[52] U.S. Cl..............259/2, 198/220 R, 259/DIG. 42
[51] Int. Cl................................................B01f 11/00
[58] Field of Search..259/2, 72, DIG. 42; 198/220 R, 198/220 DB, 220 CC, 220 CA

[56] References Cited

UNITED STATES PATENTS

| 3,346,097 | 10/1967 | Carrier..................198/220 DB |
| 3,348,664 | 10/1967 | Renner......................198/220 |
| 3,089,582 | 5/1963 | Musschoot.................198/220 |
| 3,171,159 | 3/1965 | Cunder..........................259/2 |

*Primary Examiner*—Robert W. Jenkins
*Attorney*—Marshall & Yeasting

[57] ABSTRACT

A vibratory conveyor for mixing granular or pulverized material is vibrated along a straight inclined path perpendicular to the longitudinal axis of the conveyor trough. Material in the trough, because of the inclined transverse vibration, tends to move or roll in a closed path with the material in contact with the trough moving toward and up the side of the trough and the material on top sliding down toward the low side of the mass of material, thus being gently but thoroughly mixed. The mass of material, because of a slight lengthwise decline of the trough, slowly moves toward the lower end, i.e. discharge end, of the trough as it is mixed. Preferably, the trough is vibrated by a pair of contra-rotating, inertially synchronized eccentric weights.

2 Claims, 2 Drawing Figures

Patented Aug. 29, 1972 3,687,420

INVENTOR.
HANS SCHWEINFURTH
ROLF LAMBACH
BY Marshall & Yeasting

ATTORNEYS

DEVICE FOR MIXING GRANULAR AND/OR PULVERIZED BULK MATERIAL

BACKGROUND OF THE INVENTION

It is known that devices exist in the form of closed vessels in which different components are mixed through rotary movement. The material charged into these mixing devices is made to undergo a rolling motion either by being carried along by the rotating outer shell of the vessel or by rotating internals (mixing shafts, etc.).

A disadvantage of the known devices with rotating external shell is that the rolling motion is primarily induced in whole layers of material and the relative movement of material particles within a layer is insignificant. Depending on the properties of the material, this results in the formation of unwanted crusts or pockets and, consequently, a fairly long residence time of the material in the device is necessary to achieve a homogeneous mix.

Better mixing is achieved in devices with rotating paddles or with shell and paddles rotating in opposite directions, but the disadvantage is that direct contact of the material with the rotating parts will frequently destroy the granules or, at least, cause abrasion. Abraded particles adhering to internal surfaces necessitate lengthy cleaning procedures. In cases where final products of different compositions have to be mixed successively and any remnants of the previous product must first be removed in order to meet product specifications, e.g. products with color additives, such lengthy cleaning intervals are a grave disadvantage.

SUMMARY OF THE INVENTION

The object of the invention is to provide apparatus for thoroughly mixing granular or pulverent materials with a gentle, non-abrasive action. According to the invention this is accomplished by slowly feeding the material through a conveyor trough that is vibrated along a straight inclined path perpendicular to the length of the trough. The vibratory motion conveys the lower layers of material toward and up a side wall of the trough while the upper layers slide down over the lower layers. A slow longitudinal motion of the mass of material, at a speed selected according to the desired residence time, is accomplished by suitably declining the trough from its input to its output end.

While various types of vibration generators may be used, satisfactory linear vibratory motion may be obtained from a pair of contra-rotating, inertially synchronized eccentric weights.

DESCRIPTION OF THE PREFERRED EMBODIMENT

Figure 1:
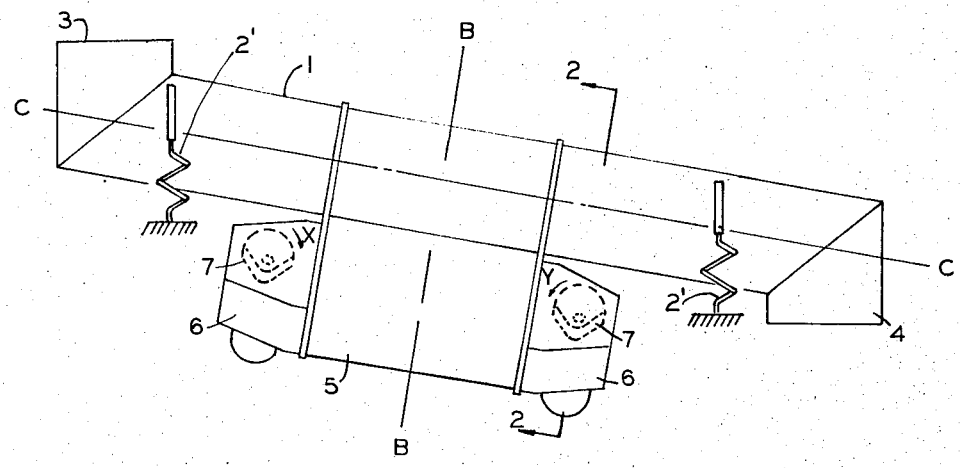
FIG. 1 is a side view of a vibratory mixing conveyor constructed according to the invention.
Figure 2:
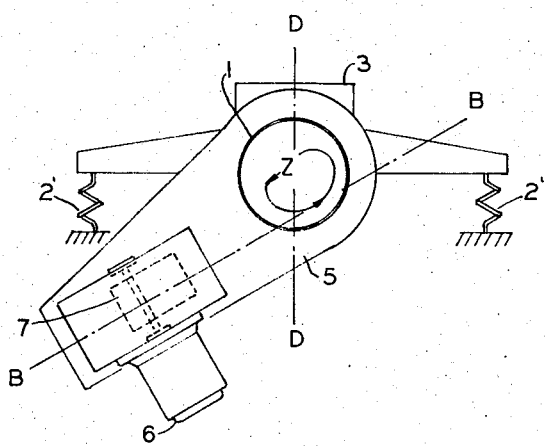
FIG. 2 is a cross-section as seen from the line 2—2 of FIG. 1.

A material carrier or trough 1 is resiliently supported on four isolation springs 2 and 2'. The trough 1 is preferably tubular and has a material inlet 3 and material outlet 4. While a tubular trough is shown, any trough having rounded corners may be used. A saddle 5 is attached to the trough 1, spanning a space of about one third the length of the trough. A pair of motors 6 and 6' are mounted on the saddle 5, the motors, having eccentric weights 7 and 7', rotate in opposite directions as indicated by arrows $x$ and $y$. The motors 6, 6' with eccentric weights 7, 7' are preferably constructed according to the disclosure of U.S. Pat. No. 2,972,688 issued to Walter Mahlfeldt.

With such an arrangement, the two eccentric weights 7 and 7' automatically synchronize and the sum of the two centrifugal forces generates a linear vibratory force acting perpendicularly to a line connecting the two motor axes in the plane of the eccentric weights.

The saddle 5 is attached to the trough 1 so that the line of action of the vibratory forces produced by the rotating eccentric weights is inclined to the horizontal and is perpendicular to the longitudinal axis of the trough. Furthermore the mass of the trough, saddle, and motors is distributed so that the line of action of the vibratory force is through the center of gravity of the assembly. This mass distribution ensures a linear vibration of the assembly free of rotary vibration. Under the influence of the forces of acceleration, the material components fed into the device are subjected to micro-throw tossing in the direction of the vibrations B—B, with the result that the individual material particles migrate in an upward direction on the rounded or sloping wall of the trough 1. The upward movement ends about half-way up the tube wall. Further particles coming up from the bottom will eventually cause the particles already at the top to slide down along the upper material surface, the result being a continuous induced circulation of the particles in the direction $z$ indicated by the arrow. Thorough mixing of several components is further aided by the fact that the induced force is transmitted to each individual particle and, owing to mutual friction and interlocking as a result of the mass moments of inertia usually being different, the particles will not only undergo a rolling motion but will also be subjected to an additional relative movement. The longitudinal axis C—C of the tube being slanted, the rolling motion will be on a helical path towards material outlet 4, thus ensuring a continuous material flow through the tube.

The invention is not limited to the example described. The vibratory forces might be induced by electro-magnetic vibrators or by crankdrive mechanisms. It should also be possible to introduce a further vibratory component in the direction of material flow in order to promote this flow. The material carrier may likewise be of the open pan type.

In addition to mixing, the device according to the invention permits other effects to be achieved. For example, the troughed material carrier may be constructed so as to permit air to be introduced for cooling or heating purposes. The device might also be used as a reaction vessel.

The device may also serve for pelletizing certain materials through the addition of water and bonding agents. This is achieved through the vibration compacting and dewatering the material and causing the formation of globules through the rolling motion.

We claim:

1. A device for mixing granular or powdered bulk material comprising, an elongated conveying trough the lower portion of which is substantially semicircular in crosssection, resilient means supporting the trough for vibration, a saddle attached to and extending from one side of the trough, a vibration generator mounted in the saddle and comprising mass means that is coupled to the saddle and that is movable along an inclined path that extends through the centers of gravity of the mass means and trough and that is perpendicular to the longitudinal axis of the trough, and means for moving said mass means along said path, whereby said trough is vibrated along an inclined path that is perpendicular to its longitudinal axis.

2. A device according to claim 1 in which said mass means consists of a pair of contra-rotating eccentric weights phased so that the combined center of gravity of said weights moves along said inclined path.

* * * * *